United States Patent
Dubus et al.

(10) Patent No.: US 8,474,846 B2
(45) Date of Patent: Jul. 2, 2013

(54) THRUST BEARING AND SUSPENSION FOR VEHICLE

(75) Inventors: Jérôme Dubus, La Riche (FR); Richard Corbett, Fondettes (FR); Samuel Viault, Saint-Antoine-du-Rocher (FR)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 13/383,739

(22) PCT Filed: Jul. 13, 2010

(86) PCT No.: PCT/EP2010/060020
§ 371 (c)(1),
(2), (4) Date: Feb. 27, 2012

(87) PCT Pub. No.: WO2011/006881
PCT Pub. Date: Jan. 20, 2011

(65) Prior Publication Data
US 2012/0146306 A1  Jun. 14, 2012

(30) Foreign Application Priority Data
Jul. 17, 2009  (FR) ...................................... 09 54968

(51) Int. Cl.
*B60G 15/06* (2006.01)
*F16F 9/30* (2006.01)

(52) U.S. Cl.
USPC ............. 280/124.155; 280/124.147; 267/220; 384/609; 188/321.11

(58) Field of Classification Search
USPC ..................... 280/124.147, 124.155, 124.145, 280/125.146; 384/607, 609, 511, 615, 617, 384/618, 614; 267/219, 220, 221; 188/321.11
See application file for complete search history.

(56) References Cited

U.S. PATENT DOCUMENTS
5,467,971 A * 11/1995 Hurtubise et al. ............ 267/220
7,032,912 B2 * 4/2006 Nicot et al. ............ 280/124.147
(Continued)

FOREIGN PATENT DOCUMENTS
DE 19921695 A1 11/1999
EP 0407360 A1 1/1991
(Continued)

*Primary Examiner* — Ruth Ilan
*Assistant Examiner* — Darlene P Condra
(74) *Attorney, Agent, or Firm* — Mark A. Ussai; Bryan Peckjian (57) ABSTRACT

The suspension bump thrust device for a motor vehicle comprises a lower supporting cover 20, an upper elastic bearing seat 18 designed to be attached to the chassis of the motor vehicle, and a rolling bearing 22 forming an axial thrust placed axially between the supporting cover and the bearing seat. The bearing comprises a lower ring, an upper ring and at least one row of rolling elements placed between the said rings. The bearing seat comprises an axial retention means 34d for the supporting cover arranged on a skirt 34c of the said seat and interacting with a complementary axial retention means 50e for the said cover. A cup 36 for reinforcing the bearing seat forms the upper ring of the rolling bearing. The reinforcing cup 36 comprises an axial portion 36a resting against the skirt of the bearing seat and a radial portion 36b radially extending the axial portion inwards.

13 Claims, 3 Drawing Sheets

| U.S. PATENT DOCUMENTS | | | |
|---|---|---|---|
| 7,114,853 B2 * | 10/2006 | Debrailly et al. | 384/612 |
| 7,192,041 B2 * | 3/2007 | Nicot et al. | 280/124.147 |
| 7,811,005 B2 * | 10/2010 | Beghini et al. | 384/609 |
| 7,891,472 B2 * | 2/2011 | Yano | 188/321.11 |
| 8,226,301 B2 * | 7/2012 | Poulle et al. | 384/609 |
| 2011/0049829 A1 * | 3/2011 | Migliore et al. | 280/124.146 |

| FOREIGN PATENT DOCUMENTS | | |
|---|---|---|
| FR | 2519102 A1 | 7/1983 |
| FR | 2778606 A1 | 11/1999 |
| FR | 2857906 A1 | 1/2005 |
| GB | 2347905 A | 9/2000 |

* cited by examiner

THRUST BEARING AND SUSPENSION FOR VEHICLE

CROSS-REFERENCE

This application is the US national stage of International Application No. PCT/EP2010/060020 filed on Jul. 13, 2010, which claims priority to French Application No. FR 0954968 filed Jul. 17, 2009.

FIELD OF THE INVENTION

The present invention relates to the field of suspension bump thrust devices used in particular on motor vehicles in the suspension struts of the steered wheels.

BACKGROUND OF THE INVENTION

Conventionally, a suspension bump thrust comprises a rolling bearing forming an axial thrust provided with an upper ring and a lower ring between which at least one row of rolling elements, for example balls or rollers, is placed. The upper and lower rings are usually mounted in contact with upper and lower supporting or bearing parts, such as cups or covers. The upper and lower covers form a housing for the rings of the rolling bearing and make it possible to provide the interface between the said rings and the adjacent elements.

The suspension bump thrust device is placed in the upper portion of the suspension strut between the body of the vehicle and a suspension spring. The spring is installed around a shock absorber piston rod the end of which is connected to the body of the vehicle by means of an elastic seat filtering the vibrations. The elastic seat comprises a flexible synthetic block and one or more cups for reinforcing or stiffening the said block. The upper bearing cover is mounted in contact with the filtering elastic seat. The suspension spring comes to bear axially on the lower bearing cover. This lower cover is, for its part, fixed relative to the body of the vehicle. For more details, it is possible to refer, for example, to Patent Applications FR-A1-2 778 606 and FR-A1-2 857 906.

Such a suspension bump thrust device allows a rotary movement between the lower bearing cover and the filtering elastic seat arising from a turn of the steered wheels of the vehicle and/or from the compression of the suspension spring, while transmitting the axial forces between the spring and the body of the vehicle.

The overall axial space requirement of the suspension bump thrust is relatively large because the filtering elastic seat, the upper bearing cover mounted against the said seat, the rolling bearing, and the lower bearing cover supporting the rolling bearing and against which the suspension spring rests are stacked axially.

Moreover, the lower and upper bearing covers between which the rolling bearing on the one hand and the filtering elastic seat on the other hand are housed form two distinct assemblies that are stored, transported, handled and mounted separately.

The object of the present invention is to remedy these drawbacks.

SUMMARY OF THE INVENTION

More particularly, the object of the present invention is to provide a suspension bump thrust device which has a low axial space requirement, has a low weight, is robust, is capable of withstanding the forces applied by the suspension spring, is of simple design and is economical.

A further object of the present invention is to provide a device that is easy to store, transport, handle and mount with a relatively low risk of axial separation of the elements forming it.

In one embodiment, the suspension bump thrust device for a motor vehicle comprises a lower supporting cover, an upper elastic bearing seat designed to be attached to the chassis of the motor vehicle, and a rolling bearing forming an axial thrust situated axially between the supporting cover and the bearing seat. The rolling bearing comprises a lower ring, an upper ring and at least one row of rolling elements placed between the said rings. The bearing seat comprises an axial retention means of the supporting cover arranged on a skirt of the said seat and interacting with a matching or complementary axial retention means of the said cover. A cup for reinforcing or stiffening the bearing seat forms the upper ring of the rolling bearing.

The reinforcing cup comprises an axial portion resting against the skirt of the bearing seat comprising the axial retention means and a radial portion radially extending the axial portion inwards. The axial and radial portions are capable of holding the axial retention means in position relative to the supporting cover.

The reinforcing cup provided to stiffen the elastic bearing seat attached to the chassis of the motor vehicle also forms the upper ring of the rolling bearing. In this respect, the reinforcing cup defines a raceway for the rolling elements of the rolling bearing. In other words, the upper ring of the rolling bearing forms the cup for reinforcing or stiffening the elastic bearing seat.

This reduces the overall axial space requirement of the bump thrust device which does not have the upper bearing cover usually provided between the upper ring of the rolling bearing and the elastic bearing seat. Moreover, a single element simultaneously performs the functions of stiffening for the elastic bearing seat and of upper rolling track or raceway for the rolling elements of the bearing. This therefore reduces the number of parts to be manufactured, stored, handled and assembled and reduces the overall weight of the bump thrust device.

Moreover, the provision on a skirt of the bearing seat of a means for axially retaining the supporting cover interacting with a complementary retention means for the said cover makes it possible to obtain a unitary assembly consisting of the elastic bearing seat, the bearing, and the lower supporting cover that can be stored, transported, handled and mounted with a relatively low risk of axial separation of the elements forming it.

Moreover, before the device is mounted between the suspension spring and the chassis of the vehicle, by virtue of the axial portion and the radial portion of the reinforcing cup increasing the rigidity of the skirt of the bearing seat comprising the axial retention means, a possible outward deformation of the said skirt that may cause the bearing seat and supporting cover to separate is limited. The radial and axial portions of the reinforcing cup make it possible to enhance the mechanical resistance of the skirt of the bearing seat to radial deformations, which reduces the risk of the elements forming the device separating axially. The axial and radial portions of the reinforcing cup are of advantage for obtaining a good stiffness of the bearing seat.

In one embodiment, the axial portion of the reinforcing cup partly surrounds the supporting cover radially.

Preferably, the radial portion extends from a guiding portion of the reinforcing cup forming a raceway for the rolling elements. The lower axial end of the axial portion of the reinforcing cup may be axially offset downwards relative to the said guiding portion.

Advantageously, the axial portion and the radial portion of the reinforcing cup are annular.

The bearing seat may comprise a flexible synthetic block mounted resting against the rigid reinforcing cup. The rigid reinforcing cup may be mounted directly against the flexible synthetic block. Advantageously, the flexible synthetic block is overmoulded onto the rigid reinforcing cup.

Preferably, the bearing seat comprises a sealing lip in friction contact with the supporting cover or the lower ring of the rolling bearing.

Therefore, the material of the elastic bearing seat is used to form a dynamic seal inside the device. "Dynamic seal" means a seal between two parts having relative movement. The bearing seat therefore makes it possible to form the upper ring of the rolling bearing but also to produce a seal for the protection of the said bearing.

At least one of the axial retention means advantageously comprises a hook extending radially inwards.

In one embodiment, the supporting cover comprises a filtration element arranging a bearing surface for a suspension spring. The filtration element may comprise a portion extending axially beyond the supporting cover and conformed so as to form a protective bellows for the shock absorber rod. The filtration element may also comprise a sealing lip in friction contact with the reinforcing cup forming the upper ring of the rolling bearing. This increases the seal of the thrust.

For this purpose, a sealing lip may also extend from the lower ring of the rolling bearing and rub against the reinforcing cup forming the upper ring of the said bearing.

In one embodiment, the device comprises a sliding bearing forming a radial thrust placed radially between the supporting cover and the reinforcing cup forming the upper ring of the rolling bearing.

This limits the frictional torque between the supporting cover and the elastic bearing seat, which makes it possible to keep substantially constant the torque to be applied by the driver of the vehicle when turning the steered wheels, and to do so even when radial forces are exerted by the suspension spring on the supporting cover. The sliding bearing may be in sliding contact between the supporting cover and the elastic bearing seat. It may also consist of an annular body and comprise axial grooves capable of being filled with lubricant. This bearing can be made of thermoplastic material.

The invention also relates to a MacPherson strut comprising a shock absorber and a suspension bump thrust device as defined above.

BRIEF DESCRIPTION OF THE DRAWINGS

The present invention will be better understood on studying the detailed description of embodiments taken as non-limiting examples and illustrated by the appended drawings in which.

DETAILED DESCRIPTION OF THE PREFERRED EMBODIMENTS

Figure 1:
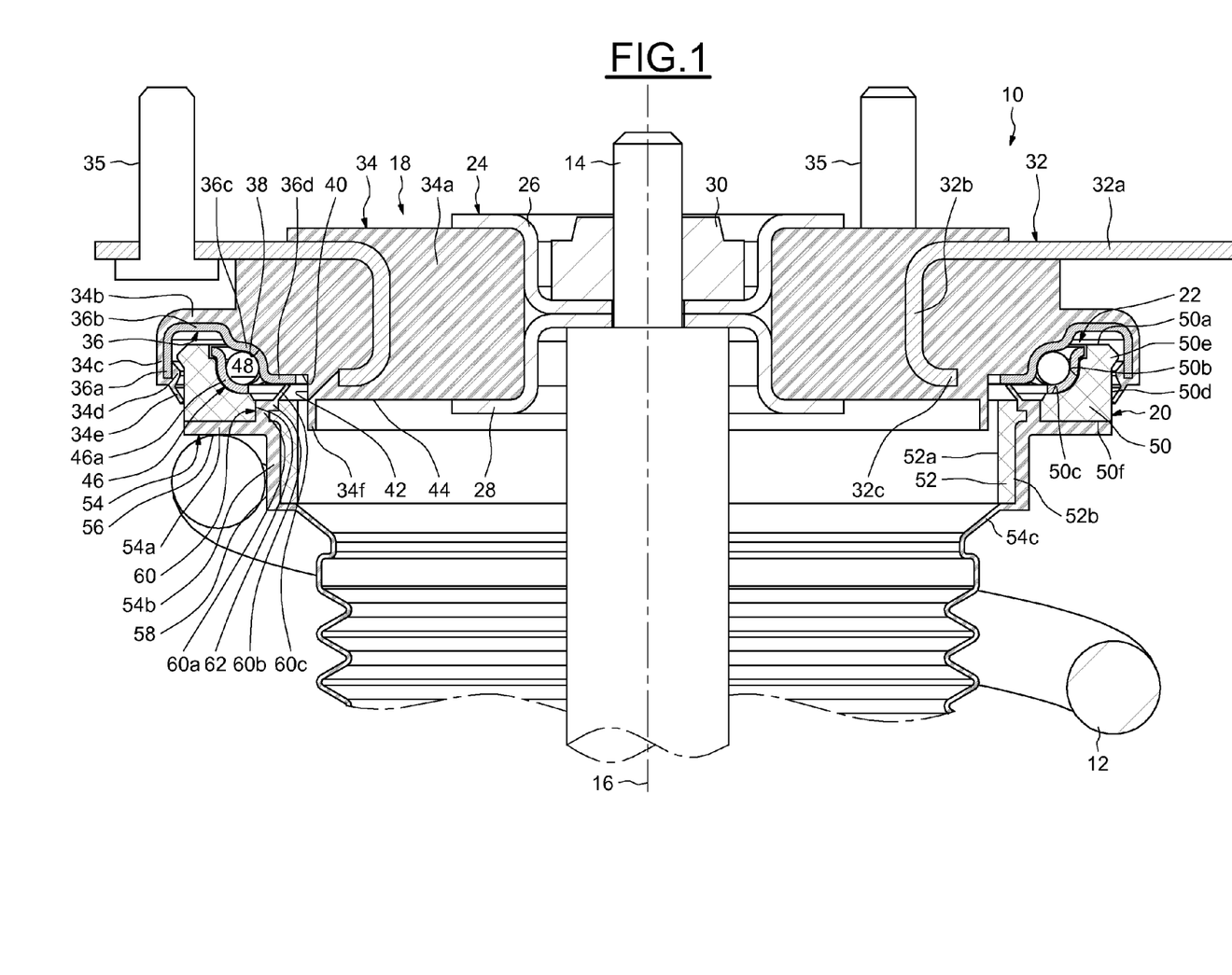
FIGS. 1 and 2 are views in axial section of suspension bump thrust devices according to first and second embodiments of the invention.

FIG. 1 shows a suspension bump thrust device, indicated by the general reference number 10, designed to be mounted between an element of the chassis of a motor vehicle and a helical suspension spring 12. The device 10 is placed around a shock absorber rod 14, with an axis 16 assumed to be vertical, the said rod being axially elongate in the form of a cylinder of revolution. The suspension spring 12 is mounted around the shock absorber rod 14.

The device 10 with its axis 16 comprises an upper elastic bearing seat 18 designed to be attached to the chassis of the vehicle, a lower supporting cover 20 and a rolling bearing 22 placed axially between the said cover and the bearing seat and forming an axial thrust.

The device 10 allows a rotary movement between the supporting cover 20 and the elastic seat 18 and transmits the axial forces between the suspension spring 12 and the chassis of the vehicle in a reduced axial space requirement.

The bearing seat 18 comprises an annular inner connecting element 24 formed of two metal and identical cups 26, 28 onto which the upper end of the shock absorber rod 14 is mounted by means of a nut 30. The bearing seat 18 also comprises an annular outer connecting element 32 centred on the axis 16 and used to secure the said seat to the chassis of the vehicle.

The bearing seat 18 also comprises a flexible or elastic synthetic block 34 partly bonded to the outer connecting element 32 and clamped between the cups 26, 28. The block 34 provides an elastic or flexible axial connection with filtration of the vibrations between the shock absorber rod 14 and the chassis of the vehicle. The outer connecting element 32 comprises a radial portion 32a partly extending outside the block 34 and used to attach the bearing seat 18 to the chassis of the vehicle by fastening members such as screws 35. The radial portion 32a is extended axially downwards, from its lower end, via an axial portion 32b, itself extended at its lower end by a radial portion 32c directed outwards. A portion of the radial portion 32a and the axial portion 32b and radial portion 32c are embedded into a solid annular portion 34a of the block 34.

The block 34 comprises an annular radial collar 34b radially extending outwards the outer surface of the solid portion 34a. The collar 34b is extended, from an edge of large diameter, axially downwards by a not very thick outer annular skirt 34c partly radially surrounding the supporting cover 20.

As will be described in greater detail below, the inner edge of the skirt 34c comprises, at its lower end, a circularly continuous or discontinuous hook 34d directed radially inwards and designed to interact with the supporting cover 20 in order to allow the said cover to be axially coupled onto the bearing seat 18.

The block 34 also comprises a relatively thin outer annular sealing lip 34e extending obliquely protruding inwards from the lower end of the hook 34d. The sealing lip 34e is curved downwards and comes into friction contact with the supporting cover 20 in order to limit the intrusion of pollutant particles radially between the skirt 34c of the bearing seat 18 and the supporting cover 20. The curvature of the sealing lip 34e is advantageous because it increases its ability to repulse splashes of water and other pollutant particles. Moreover, during such splashes, the pressure of contact between the dynamic sealing lip 34e and the supporting cover 20 increases, which further increases its effectiveness.

In order to increase the effectiveness of filtration of the device 10 in this zone, the hook 34d is situated radially in the immediate vicinity of the outer surface of the supporting cover 20 so as to form, in cooperation with the latter, a seal by narrow passageways placed downstream of the sealing lip 34e, considering the direction of movement of the pollutant particles that may be introduced between the supporting cover 20 and the bearing seat 18.

In order to obtain a good seal between the supporting cover 20 and the bearing seat 18, the block 34 also comprises a short inner annular skirt 34f extending axially downwards from the lower surface of the solid portion 34a and being situated radially in the vicinity of the bore of the supporting cover 20 so as to form with the latter a seal by narrow passageway.

The bearing seat 18 also comprises a cup 36 for reinforcing or stiffening the block 34. The block 34 is advantageously made in a single piece by overmoulding a flexible or elastic synthetic material, for example an elastomer such as rubber, onto the inner connecting element 24 and outer connecting element 32 and onto the reinforcing cup 36. Advantageously, the reinforcing cup 36 is obtained at lower cost from a thin metal sheet blank by cutting and stamping. The cup 36 is in this instance in direct contact against the block 34; there is no intermediate element.

The cup 36 comprises an outer annular axial portion 36a resting against the bore of the skirt 34c of the block 34 and extending radially inwards, to an upper axial end, via an annular radial portion 36b in contact against the lower surface of the collar 34b. A small-diameter edge of the radial portion 36b is extended inwards by an annular toroidal portion 36c in contact against a lower toroidal surface 38 matching the shape of the solid portion 34a. A small-diameter edge of the toroidal portion 36c is extended inwards via an annular radial portion 36d coming to rest against an annular radial portion 40 of the block 34 radially extending the toroidal surface 38 inwards. The lower axial end of the axial portion 36a is axially offset downwards relative to the toroidal portion 36c. The radial portion 40 of the block 34 is extended axially downwards via an annular axial portion 42, itself extended radially inwards via an annular radial portion 44 against which the cup 28 of the inner connecting element 24 rests. The skirt 34f extends axially from the radial surface 44 so as to axially extend downwards the axial portion 42.

The reinforcing cup 36 is bonded to the lower surface of the block 34 formed by the radial portion 40, toroidal portion 38 and the lower face of the collar 34b. It is also bonded to the bore of the skirt 34c, the hook 34d covering a portion of the bore of the axial portion 36a. The lower end of the said portion is also covered by the material of the block 34. As indicated above, the cup 36 makes it possible to stiffen the block 34 of the bearing seat 18. Moreover, the axial portion 36a and radial portion 36b make it possible to ensure a correct positioning and retention of the hook 34d and of the sealing lip 34e relative to the supporting cover 20. The lower surface of the reinforcing cup 36 formed by the lower faces of the radial portions 36b, 36d and toroidal portion 36c is not covered by the material of the block 34.

The rolling bearing 22, with its axis 16, is formed by the reinforcing cup 36 forming the upper ring of the said bearing and by a lower ring 46 between which a row of rolling elements 48, in this instance made in the form of balls, is housed. A cage could also be provided for maintaining an even circumferential spacing between the rolling elements 48. The rolling elements 48 are placed between raceways formed by the lower ring 46 and the reinforcing cup 36 forming the upper ring.

The lower ring 46 comprises an annular toroidal portion 46a having in cross section a quarter-circle concave internal profile and being capable of forming a toroidal raceway for the rolling elements 48, the toroidal portion 46a being extended outwards by a radial portion extending from an upper edge of the toroidal portion 46a. Advantageously, the lower ring 46 is obtained in an economical manner from a thin metal sheet blank by cutting and stamping.

The lower surface of the toroidal portion 36c of the reinforcing cup 36 also has in cross section a quarter-circle concave internal profile and forms a toroidal raceway for the rolling elements 48 sliding directly on the said cup 36 of the bearing seat 18.

Therefore, a single element makes it possible to produce both the reinforcement or stiffening of the block 34 of the bearing seat 18 and the upper ring of the rolling bearing 22 in oblique contact. The rolling elements 48 are mounted directly against the reinforcing cup 36 without interposition of an intermediate upper bearing cover inside which an upper ring specific to the rolling bearing is housed, as is conventionally the case in the bump thrust devices of the prior art.

In other words, the number of parts forming the bump thrust device 10 are limited by incorporating the upper ring of the rolling bearing 22 in the bearing seat 18 so that the said ring forms a reinforcing cup of the seat. The axial space requirement and the weight of the device 10 are reduced.

The supporting cover 20, with its axis 16, advantageously consists of a single-piece part made by moulding of a thermoplastic material, for example a polyamide PA 6.6 which may or may not be reinforced with glass fibres. The supporting cover 20 comprises an annular solid radial portion 50 with an external diameter smaller than that of the axial portion 36a of the cup 36 of the bearing seat 18 and which is extended, from a small-diameter inner edge, by an annular axial portion 52 extending downwards.

The radial portion 50 comprises an upper annular radial surface 50a facing and at a distance from the radial portion 36b of the reinforcing cup 36 of the bearing seat 18 and extended axially downwards from a small-diameter edge via an annular toroidal surface 50b against which the lower ring 46 rests. The toroidal surface 50b matches the shape of the toroidal portion 46a of the lower ring and is extended inwards by an annular stepped surface 50c extending radially.

The radial portion 50 also comprises an axial outer surface 50d with a smaller diameter than the inner diameter of the hook 34d of the bearing seat 18 in order to allow an annular radial space to subsist between the outer surface 50d and the said hook. The axial outer surface 50d comprises, at an upper axial end, an annular radial rib 50e extending outwards towards the portion 36a of the cup 36 of the bearing seat 18. The rib 50e is situated axially above the hook 34d of the bearing seat 18 and has a frustoconical lower surface designed to interfere with the said hook and prevent a separation of the supporting cover 20 and of the bearing seat 18 before the bump thrust device 10 is mounted between the body of the vehicle and the suspension spring 12. For this purpose, the rib 50e has a diameter greater than that of the hook 34d so that a diametral interference can exist between the bearing seat 18 and the supporting cover 20. The hook 34d therefore forms an axial retention means situated on the bearing seat 18 and interacting with a complementary axial retention means of the supporting cover 20, i.e. the rib 50e. Moreover, the hook 34d and the rib 50e form seals via narrow passageways in order to prevent the intrusion of foreign bodies or polluting particles between these two elements.

The axial portion 52 comprises an axial bore 52a the upper end of which is connected to the small-diameter edge of the stepped surface 50c. The axial portion 52 comprises an axial outer surface 52b extended outwards to an upper end via an annular lower radial surface 50f of the radial portion 50 the large-diameter edge of which is connected to the lower end of the outer surface 50d.

The supporting cover 20 also comprises a filtration element 54 interposed axially between the latter and the suspension spring 12 in order to absorb the vibrations of the said spring.

The filtration element 54 comprises an annular radial portion 54a resting against the lower radial surface 50f of the supporting cover 20 and substantially flush with the outer cylindrical surface 50d. The radial portion 54a is extended axially, from a small-diameter edge, via an annular axial portion 54b extending downwards and resting against the outer surface 52b of the supporting cover 20. The radial portion 54a makes an annular radial bearing surface 56 for the top end turn of the suspension spring 12, which extends inwards via an annular axial surface 58 ensuring the centring of the said spring. The axial surface 58 is formed by the outer surface of the axial portion 54b. The lower end of the axial portion 54b is extended axially downwards via a portion 54c extending axially beyond the supporting cover 20 and conformed so as to form a protective bellows radially surrounding the shock absorber rod 14 and the elements mounted around the said rod (not shown). The filtration element 54 also thus forms a protective bellows for the shock absorber rod 14.

The filtration element 54 is overmoulded onto the supporting cover 20. It can be made of a flexible synthetic material, for example an elastomer such as a rubber or else polyurethane or elastomer thermoplastic.

When the filtration element 54 is overmoulded, a packing gland 60 is formed. In this respect, an annular axial channel 62 is made in the thickness of the supporting cover 20. During the overmoulding, the melted flexible material extends across the channel 62 in order to form the packing gland 60. It comprises an annular ring 60a formed inside the channel 62 and extending axially from the radial portion 54a until it emerges at the stepped surface 50c of the supporting cover 20.

The packing gland 60 also comprises an annular heel 60b extending the ring 60a radially inwards, and a relatively thin annular sealing lip 60c extending from the said heel protruding obliquely inwards so as to come into friction contact with the radial portion 36d of the cup 36 forming the upper ring of the rolling bearing 22. The sealing lip 60c fulfils a dynamic sealing function with the bearing seat 18. In this instance it interacts with the reinforcing cup 36 made of metal which promotes the obtaining of a good seal. The sealing lip 60c is curved obliquely upwards and inwards. This curvature is advantageous because it increases its ability to repulse possible splashes of water or other pollutants. The sealing lip 60c therefore forms a particularly effective deflector. Moreover, during such splashes, the pressure of contact between the said lip and the reinforcing cup 36 increases, which further increases its effectiveness.

Figure 2:
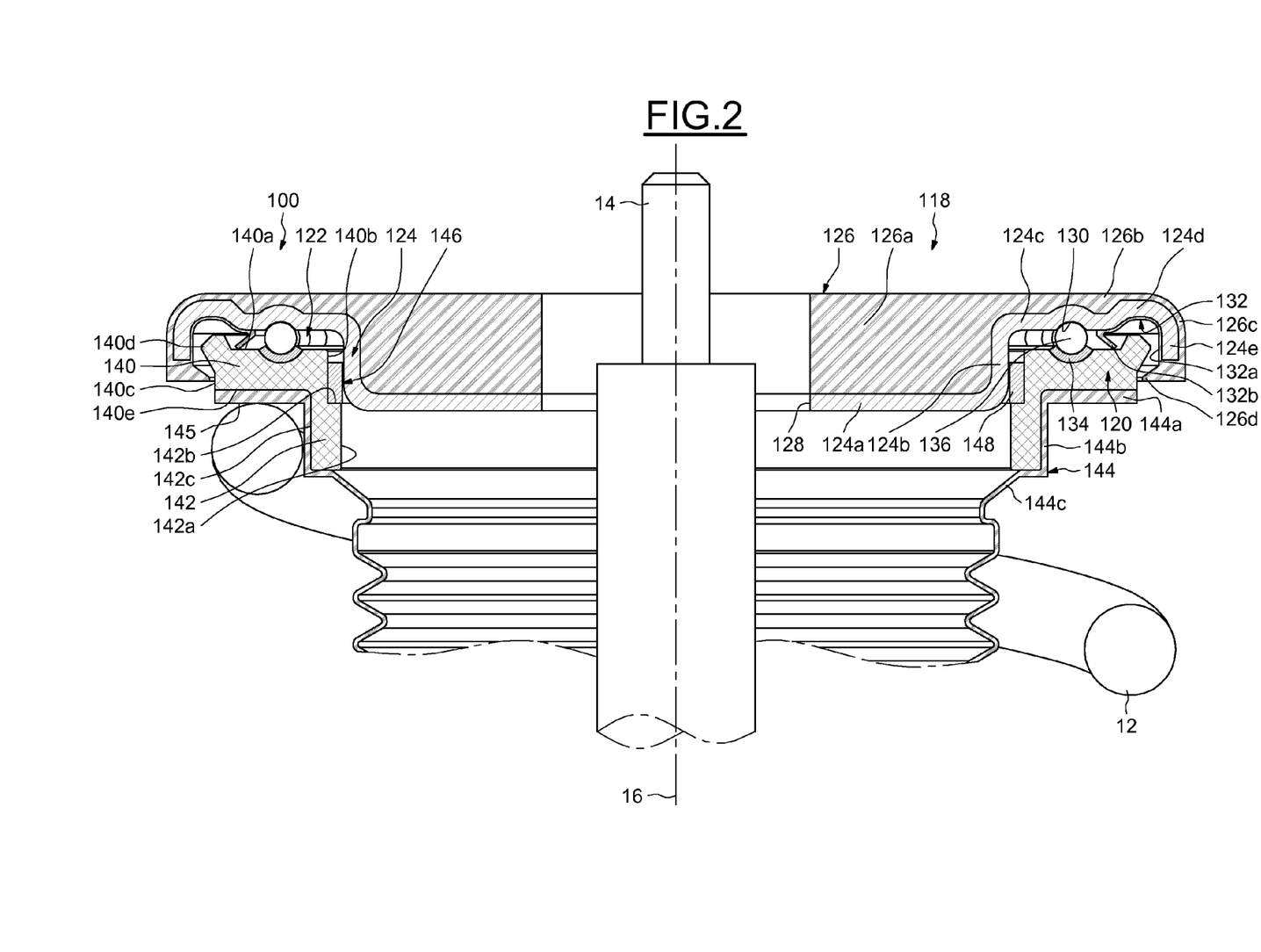

FIG. 2 shows a suspension bump thrust device 100 according to a second embodiment mounted around the shock absorber rod 14 and against which the suspension spring 12 rests.

In a manner similar to the embodiment previously described, the device 100, with its axis 16, comprises an upper elastic bearing seat 118, a lower supporting cover 120, and a rolling bearing 122 placed axially between them with its upper ring formed by a reinforcing cup 124 of the bearing seat 118.

The bearing seat 118 comprises a flexible or elastic synthetic block 126 bonded to the cup 124 for reinforcing or stiffening the said block. The block 126 is advantageously made in a single piece by overmoulding of an elastomer such as rubber. The reinforcing cup 124 comprises an annular radial portion 124a delimiting a bore 128 for the passage of the shock absorber rod 14 and which is extended axially upwards, at a large-diameter edge, by an annular axial portion 124b. The upper end of the axial portion 124b is extended radially outwards by an annular axial portion 124c on which a circular channel or groove 130 is formed having in cross section a concave inner profile, the said groove being oriented axially downwards. An outer edge of the radial portion 124c is extended outwards by a short frustaconical portion widening out, itself extended by an annular radial portion 124d. The outer edge of the radial portion 124d is extended axially by an outer annular axial portion 124e which partially radially surrounds the supporting cover 120. The lower axial end of the axial portion 124e is offset axially downwards relative to the radial portion 124c. As a variant, it would be possible to have the inner edge of the radial portion 124a of the cup 124 extend axially upwards via an axial portion which would itself be extended by a radial portion resting against an upper surface of the block 126 and being able to be used for securing the device 100 to the chassis of the vehicle. The reinforcing cup 124 is advantageously made by cutting and stamping a thin metal sheet blank.

The block 126 comprises an annular solid portion 126a bonded to the upper surface of the radial portion 124a and to the inner surface of the axial portion 124b of the reinforcing cup 124. The solid portion 126a is extended, at a large-diameter edge, by an annular radial portion 126b matching the shape of the radial portions 124c, 124d of the cup 124 while being bonded to the upper surfaces of the said portions. A large-diameter edge of the radial portion 126b is extended axially downwards by an annular skirt 126c secured to the outer surface of the axial portion 124e of the cup 124. The inner edge of the skirt 126c is extended radially inwards by a continuous or discontinuous hook 126d circularly covering the free end of the axial portion 124e of the cup 124 and directed radially inwards in order to interact with the supporting cover 120 in order to allow the axial coupling of the said cover onto the bearing seat 118.

The block 126 also comprises a packing gland 132 comprising an annular static portion 132a covering the bore of the axial portion 124e and the lower surfaces of the radial portions 124d, 124c of the reinforcing cup 124. The static portion 132a extends to the vicinity of the groove 130 made on the radial portion 124c. The inner edge of the static portion 132a is extended by a relatively thin annular sealing lip 132b extending obliquely protruding downwards and outwards so as to come into friction contact with the supporting cover 120. The sealing lip 132b fulfils a dynamic sealing function with the supporting cover 120. The orientation of the sealing lip 132b increases its ability to repulse possible splashes of water or of other pollutant particles. The sealing lip 132b forms a particularly effective deflector. Moreover, during such splashes, the pressure of contact between the lip and the supporting cover 120 increases, which increases its effectiveness.

The rolling bearing 122, with its axis 16, is formed by the reinforcing cup 124 forming the upper ring of the bearing and by a lower ring 134 between which a row of rolling elements 136, in this instance made in the form of balls, is housed. A cage could also be provided for maintaining an even circumferential spacing between the rolling elements 136. The rolling elements 136 are placed between raceways formed by the lower ring 134 and by the groove 130 of the reinforcing cup 124.

The lower ring 134 has a generally annular shape and can be obtained cheaply by cutting and stamping a metal sheet blank. The lower ring 134 has in cross section a concave inner profile oriented axially upwards and capable of forming a raceway for the rolling elements 136. The groove 130 of the reinforcing cup also has in cross section a concave inner profile oriented axially downwards forming a raceway for the rolling elements 136.

Therefore, in a manner similar to the first embodiment described, the cup 124 makes it possible both to reinforce the block 126 of the bearing seat 118 and guide the rolling elements 136 by forming the upper ring of the rolling bearing 122.

The supporting cover 120, with its axis 16, advantageously consists of a single piece made by moulding a thermoplastic, for example a polyamide PA 6.6 which may or may not be reinforced with glass fibres. The supporting cover 120 comprises an annular solid radial portion 140 with an outer diameter smaller than that of the static portion 132a of the packing gland 132 of the bearing seat 118 and which is extended, from a small-diameter inner edge, via an annular axial portion 142 extending downwards.

The radial portion 140 comprises an upper annular radial surface 140a facing and at a distance from the radial portion 124b of the reinforcing cup 124 of the bearing seat 118. The sealing lip 132b rubs against the radial surface 140a. Alternatively, it could be considered to make it rub against the lower ring 134 made of metal in order to increase its operational effectiveness. The radial surface 140a is extended axially downwards from a small-diameter edge via an inner axial surface 140b situated radially facing the axial portion 124b of the cup 124 of the bearing seat 118. The radial portion 140 also comprises an axial outer surface 140c of smaller diameter than the inner diameter of the hook 126d of the bearing seat 118 in order to allow an annular radial space to subsist between them. The outer surface 140c comprises, at an upper axial end, an annular rib 140d extending outwards in the direction of the static portion 132a of the packing gland 132 of the bearing seat 118. The rib 140d is situated axially above the hook 126d of the bearing seat 118. In a manner similar to the first embodiment described, the rib 140d has a larger diameter than that of the hook 126d so that a diametral interference can exist between the bearing seat 118 and the supporting cover 120 at the level of these two elements. The hook 126d forms an axial retention means situated on the bearing seat 118 and interacting with a complementary axial retention means situated on the supporting cover 120. The hook 126d and the rib 140d also form seals by narrow passageways so as to prevent the intrusion of foreign bodies or of polluting particles between these two elements.

The axial portion 142 comprises an axial bore 142a the upper end of which is extended by an annular radial surface 142b extending inwards and being connected to the lower end of the axial surface 140b of the radial portion 140. The axial portion 142 comprises an outer axial surface 142c extended outwards at an upper end by a radial lower surface 140e of the radial portion 50 the large-diameter edge of which is connected to the lower end of the outer surface 140c.

The supporting cover 120 also comprises a filtration element 144 interposed between the latter and the suspension spring 12 in order to absorb the vibrations of the said spring. The filtration element 144 comprises an annular radial portion 144a resting against the lower radial surface 140e of the supporting cover 20 which is extended axially, from a small-diameter edge, by an axial portion 144b extending downwards and resting against the outer surface 142c of the supporting cover 20. The lower end of the axial portion 144b is extended axially downwards by a portion 144c extending axially beyond the supporting cover 120 and conformed so as to form a protective bellows radially surrounding the shock absorber rod and the elements mounted around the said rod. The portions 144a to 144c of the filtration element 144 are identical to the portions 54a to 54c of the filtration element 54 of the first embodiment described. The radial portion 144a makes a radial bearing surface 145 for the top end turn of the suspension spring 12, the axial portion 144b providing the centring of the said spring. The filtration element 144 is overmoulded on the supporting cover 20 and advantageously made of a flexible synthetic material, for example of elastomer such as a rubber or else polyurethane or elastomer thermoplastic.

In this embodiment, the device 100 also comprises a sliding bearing 146, with its axis 16, placed radially between the supporting cover 20 and the bearing seat 18. More precisely, the said bearing is placed radially between the outer surface of the axial portion 124b of the cup 124 of the bearing seat 118 and the axial surface 140b of the radial portion 140 of the supporting cover 120 coming into radial contact against these two elements. The sliding bearing 146 is mounted axially resting against the radial surface 142b of the supporting cover.

Figure 3:
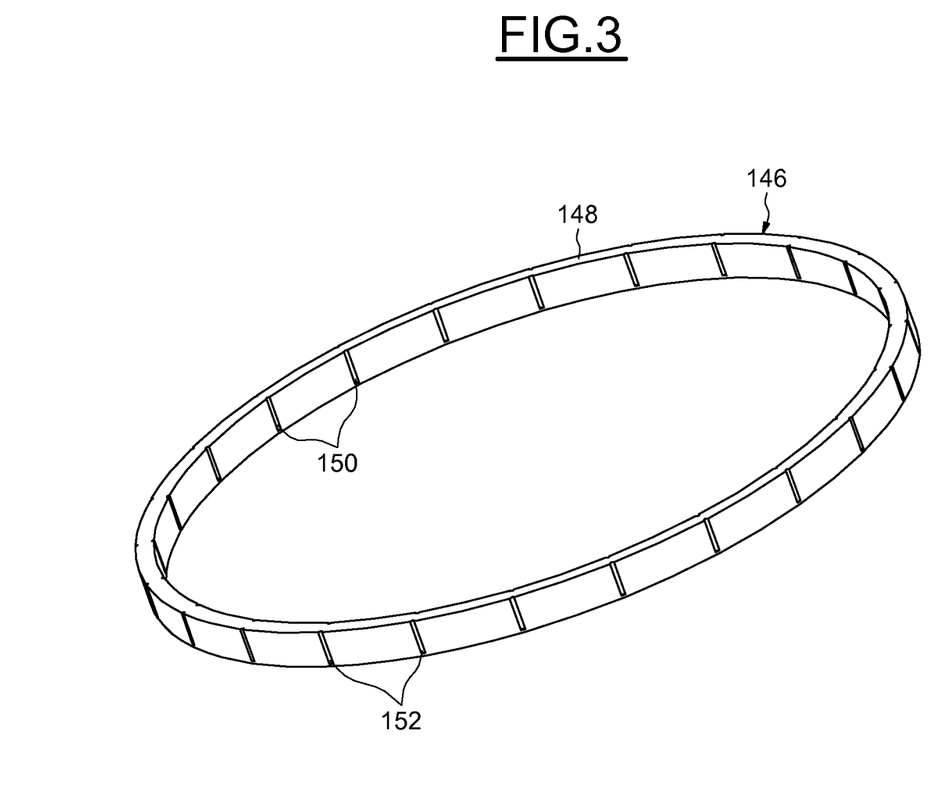
FIG. 3 is a view in perspective of a sliding bearing of the device of FIG. 2.

As illustrated more visibly in FIG. 3, the sliding bearing 146 comprises an intermediate sliding ring or body 148, of generally annular shape, comprising respectively, on its inner and outer surfaces, a plurality of axial grooves 150 and 152. The grooves 150, 152 are made on the inner and outer surfaces of the body 148 while being spaced from one another evenly in the circumferential direction.

Each outer groove 152 is aligned with an inner groove 150 considering the circumferential direction.

In the illustrated exemplary embodiment, the grooves 150, 152 are each twenty four in number. Naturally, it is possible to provide another number of them and to place the grooves 150 differently relative to the grooves 152. Alternatively, it would be equally possible to provide grooves only on the outer surface or on the inner surface of the body 148.

The grooves 150, 152 extend axially from an upper radial surface of the body 148 to the vicinity of an opposite lower radial surface of the said body. These grooves are advantageously filled with lubricant, such as grease. Providing grooves 150, 152 that do not open out at the bottom end of the body 148 makes it possible to promote the retention of the lubricant on the said body and thus to limit the friction between the sliding bearing 146 and the supporting cover 140 and the bearing seat 118.

Again making reference to FIG. 2, the inner surface of the body 148 is in contact against the axial portion 124b of the reinforcing cup 124, the outer surface of the said body resting against the axial surface 140b of the supporting cover 20. A sliding contact is provided on the one hand between the inner surface of the sliding bearing 146 and the reinforcing cup 124, and on the other hand between the outer surface of the said bearing and the supporting cover 20. The sliding bearing 146 may advantageously be made by moulding a rigid thermoplastic material, for example a polyamide (PA), a polyester such as polybutylene terephthalate (PBT) or else a polyolefin such as polyethylene (PE) or polypropylene (PP).

The arrangement of the sliding bearing 146 radially between the supporting cover 120 and the bearing seat 118 makes it possible to withstand the radial forces applied by the suspension spring 12 without increasing the friction torque between these two elements in order to keep substantially constant the torque to be applied for the driver to turn the steered wheels of the motor vehicle.

The use of the sliding bearing 146 makes it possible to provide a rolling bearing 122 with axial contact.

Moreover, the arrangement of the sliding bearing 146 between the axial surface 140b of the supporting cover 120 and the axial portion 124b of the reinforcing cup 124 makes it possible to limit, in this zone, the intrusion of external polluting agents that can then make their way towards the rolling bearing 122. In other words, the sliding bearing 146 also forms a sealing means for the rolling bearing 122. The functions of sealing or protecting the rolling bearing 122 and of absorbing the radial forces applied by the suspension spring 12 are therefore performed by a single member.

As a variant, it would also be possible to provide, on the inner surface of the body 148, a continuous or discontinuous radial protuberance in the circumferential direction and designed to be mounted in a corresponding housing made on the outer surface of the axial portion 124b of the reinforcing cup 124 so as to provide the axial retention of the supporting cover 120 on the bearing seat 118. Such a protuberance forming a retaining hook could be provided in addition to or in replacement of the hook 126d of the bearing seat 118.

In the embodiments described, the reinforcing cup of the elastic bearing seat comprises a portion forming an upper ring for the rolling bearing, which makes it possible to avoid the use of an upper ring specific to the rolling bearing and of an upper cover mounted between the said bearing and the elastic bearing seat. This reduces the number of parts that have to be assembled when the suspension bump thrust devices are mounted and the number of parts to be stored, transported and handled. The axial space requirement and the overall weight of the bump thrust devices are also reduced. In the second embodiment, the reinforcing cup forming a raceway for the rolling elements is the only reinforcing element of the bearing seat.

The reinforcing cup of the bearing seat also makes it possible to stiffen the said seat at the skirt on which the axial retention means is arranged for the supporting cover in order to prevent a possible radial outwards movement of the skirt. This limits the risk of separating the elements forming the suspension bump thrust device.

In the illustrated embodiments, the skirt of the bearing seat forms an outer axial skirt partially radially surrounding the supporting cover. In a variant embodiment, as a replacement of or in combination with the outer axial skirt, it is possible to provide a bearing seat comprising an inner axial skirt comprising an axial retention means of the supporting cover capable of interacting with a complementary axial retention means of the said cover. The inner axial skirt may extend in the bore of the supporting cover. The reinforcing cup forming the upper ring of the rolling bearing may comprise an annular inner axial portion resting against the outer surface of the inner axial skirt and an annular radial portion radially extending inwards the said axial portion, the said axial and radial portions making it possible to hold the inner axial skirt and the associated axial retention means in position.

Moreover, in the first embodiment, the sealing lip of the bearing seat and the sealing lip provided on the supporting cover or on the inner ring of the rolling bearing make it possible to define a sealed space containing the rolling elements of the said bearing. This sealed space, sealed by the annular contact zones of the lips, prevents leakages of lubricant out of the rolling bearing and the ingress of pollutants. In the second embodiment, this sealed space is defined by the sealing lip of the bearing seat and the sliding bearing placed between the supporting cover and the reinforcing cup of the said bearing seat.

The invention claimed is:

1. A suspension bump thrust device for a motor vehicle comprising:
   a lower supporting cover,
   an upper elastic bearing seat designed to be attached to the chassis of the motor vehicle, and
   a rolling bearing forming an axial thrust placed axially between the supporting cover and the bearing seat, and wherein
   the said bearing comprising a lower ring,
   an upper ring and
   at least one row of rolling elements placed between the said rings, and wherein
   the bearing seat comprises an axial retention means of the supporting cover arranged on a skirt of the said seat and interacting with a complementary axial retention means of the said cover, and wherein
   a cup for reinforcing the bearing seat forms the upper ring of the rolling bearing, and wherein
   the reinforcing cup comprises an axial portion resting against the skirt of the bearing seat and a radial portion radially extending the axial portion inwards, and wherein
   the said axial and radial portions being capable of holding the axial retention means in position relative to the supporting cover, wherein
   the axial portion of the reinforcing cup partly surrounds the supporting cover radially.

2. The device according to claim 1 wherein the radial portion extends from a guiding portion of the reinforcing cup forming a raceway for the rolling elements.

3. The device according to claim 2, wherein the lower axial end of the axial portion is axially offset downwards relative to the guiding portion.

4. The device according to claim 1, wherein the axial portion and the radial portion of the reinforcing cup are annular.

5. The device according to claim 1, wherein the bearing seat comprises a flexible synthetic block mounted resting against the rigid reinforcing cup.

6. The device according to claim 5, wherein the flexible synthetic block is overmoulded onto the rigid reinforcing cup.

7. The device according to claim 1, wherein the bearing seat comprises a sealing lip in friction contact with the supporting cover or the lower ring of the rolling bearing.

8. The device according to claim 1, wherein at least one of the axial retention means comprises a hook extending radially inwards.

9. The device according to claim 1, wherein the supporting cover comprises a filtration element arranging a bearing surface for a suspension spring.

10. The device according to claim 9, wherein the filtration element comprises a portion extending axially beyond the supporting cover and conformed so as to form a protective bellows for a shock absorber rod.

11. The device according to claim 9, wherein the filtration element comprises a sealing lip in friction contact with the reinforcing cup forming the upper ring of the rolling bearing.

12. The device according to claim 1, comprising a sliding bearing forming a radial thrust placed radially between the supporting cover and the reinforcing cup forming the upper ring of the rolling bearing.

13. A strut comprising:
   a shock absorber and
   a suspension bump thrust device having,
   a lower supporting cover,
   an upper elastic bearing seat designed to be attached to the chassis of the motor vehicle, and
   a rolling bearing forming an axial thrust placed axially between the supporting cover and the bearing seat, and wherein
   the said bearing comprising a lower ring,
   an upper ring and
   at least one row of rolling elements placed between the said rings, and wherein
   the bearing seat comprises an axial retention means of the supporting cover arranged on a skirt of the said seat and interacting with a complementary axial retention means of the said cover, and wherein a cup for reinforcing the bearing seat forms the upper ring of the rolling bearing, and wherein the reinforcing cup comprises an axial portion resting against the skirt of the bearing seat and a radial portion radially extending the axial portion inwards, and wherein the said axial and radial portions being capable of holding the axial retention means in position relative to the supporting cover, wherein the axial portion of the reinforcing cup partly surrounds the supporting cover radially.

* * * * *